United States Patent
Yoshida et al.

(10) Patent No.: US 9,954,423 B2
(45) Date of Patent: Apr. 24, 2018

(54) METHOD OF MANUFACTURING ROTOR

(71) Applicant: TOYOTA JIDOSHA KABUSHIKI KAISHA, Toyota-shi, Aichi-ken (JP)

(72) Inventors: Akira Yoshida, Toyota (JP); Hirotaka Kawaura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 15/041,600

(22) Filed: Feb. 11, 2016

(65) Prior Publication Data
US 2016/0268879 A1    Sep. 15, 2016

(30) Foreign Application Priority Data
Mar. 13, 2015  (JP) .................................. 2015-050282

(51) Int. Cl.
*H02K 15/03*    (2006.01)
(52) U.S. Cl.
CPC .................... *H02K 15/03* (2013.01)
(58) Field of Classification Search
CPC ....................................................... H02K 15/03
See application file for complete search history.

(56) References Cited

U.S. PATENT DOCUMENTS

| | | | |
|---|---|---|---|
| 2007/0063607 A1 | 3/2007 | Hattori | |
| 2010/0244605 A1* | 9/2010 | Nakano | B62D 5/0403 310/156.01 |
| 2010/0244611 A1* | 9/2010 | Akutsu | H02K 21/16 310/179 |
| 2010/0277026 A1* | 11/2010 | Yamaguchi | H02K 1/146 310/156.25 |

FOREIGN PATENT DOCUMENTS

| | | |
|---|---|---|
| JP | 2007-089291 A | 4/2007 |
| JP | 2008-113530 A | 5/2008 |
| JP | 2013-158149 A | 8/2013 |
| JP | 2014-207724 A | 10/2014 |

* cited by examiner

*Primary Examiner* — Carl Arbes
(74) *Attorney, Agent, or Firm* — Oliff PLC

(57) ABSTRACT

A method of manufacturing a rotor according to the present invention includes: a process of stacking a plurality of electromagnetic steel plates on a jig 30 to fix the electromagnetic steel plates to the jig 30, and a process of inserting magnets 21 into a plurality of respective openings 11 included in a rotor core 10 in which the plurality of electromagnetic steel plates are stacked on one another. The magnets 21 are inserted into the respective openings 11 while a structure 80 including the rotor core 10 and the jig 30 is vibrated at a resonance frequency of the structure 80.

3 Claims, 22 Drawing Sheets

METHOD OF MANUFACTURING ROTOR

INCORPORATION BY REFERENCE

This application is based upon and claims the benefit of priority from Japanese patent application No. 2015-050282, filed on Mar. 13, 2015, the disclosure of which is incorporated herein in its entirety by reference.

BACKGROUND OF THE INVENTION

1. Field of the Invention

The present invention relates to a method of manufacturing a rotor.

2. Description of Related Art

In a rotating electric machine composed of a rotor including permanent magnets and a stator including a coil, the rotor is driven to rotate based on a magnetic field created by bringing the coil on the stator side into conduction. For example, the rotor includes a rotor core formed by a plurality of electromagnetic steel plates that are stacked on one another and magnets embedded in the rotor core.

Japanese Unexamined Patent Application Publication No. 2007-89291 discloses a technique for manufacturing a rotor by inserting magnets into a plurality of respective openings included in a rotor core. In the technique disclosed in Japanese Unexamined Patent Application Publication No. 2007-89291, the rotor core is formed of a plurality of electromagnetic steel plates that are stacked on one another.

SUMMARY OF THE INVENTION

As described in the Background of the Invention, the rotor used in the rotating electric machine is formed by inserting the magnets into the plurality of respective openings included in the rotor core. In order to improve torque of the rotating electric machine, a magnetic field from the magnets needs to be efficiently transmitted to the rotor core. To enable this efficient transmission, a gap between each of the magnets and the inner wall of each of the respective openings of the rotor core needs to be narrowed.

However, when the rotor core is formed by the plurality of electromagnetic steel plates that are stacked on one another, due to a positional deviation or the like when the electromagnetic steel plates are stacked on one another, the size of the opening of the rotor core varies (see FIG. 14). That is, the degree of straightness of the opening of the rotor core is degraded. Therefore, when the gap between each of the magnets and the inner wall of each of the respective openings of the rotor core is too narrow, the area in which each of the magnets contacts the inner wall of each of the respective openings increases, and it thus becomes difficult to insert the magnets into the respective openings of the rotor core.

In view of the problem stated above, one object of the present invention is to provide a method of manufacturing a rotor in which magnets can be easily inserted into respective openings of the rotor core.

A method of manufacturing a rotor according to the present invention includes: a process of stacking a plurality of electromagnetic steel plates on a jig to fix the electromagnetic steel plates to the jig, and a process of inserting magnets into a plurality of respective openings included in a rotor core in which the plurality of electromagnetic steel plates are stacked on one another, wherein the magnets are inserted into the respective openings while a structure including the rotor core and the jig is vibrated at a resonance frequency of the structure.

In the method of manufacturing the rotor according to the present invention, the magnets are inserted into the respective openings while the structure including the rotor core and the jig is vibrated at a resonance frequency of the structure. Accordingly, the structure including the rotor core and the jig is vibrated at the resonance frequency, and thus the rotor core (the plurality of electromagnetic steel plates) may be vibrated at a large amplitude, whereby each magnet is able to pass through an uneven part of the electromagnetic steel plates when the magnets are inserted into the respective openings. It is therefore possible to reduce the area in which the magnet contacts the inner wall of the opening (electromagnetic steel plates), whereby it is possible to reduce the load required to insert the magnets into the respective openings. It is therefore possible to provide a method of manufacturing the rotor in which the magnets can be easily inserted into the respective openings of the rotor core.

In the method of manufacturing the rotor according to the present invention, the structure may further include a guiding member that guides the magnets into the respective openings when the magnets are inserted into the respective openings, and the magnets may be inserted into the respective openings while the structure including the rotor core, the jig, and the guiding member is vibrated at a resonance frequency of the structure. By using the guiding member as stated above, the magnets can be definitely inserted into the respective openings of the rotor core.

In the method of manufacturing the rotor according to the present invention, the magnets may be inserted into the respective openings while inclining the structure so that an opening direction of the opening becomes inclined with respect to a vertical direction. According to this structure, it is possible to suppress the speed of the magnets from being too fast when the magnets are inserted into the respective openings, whereby it is possible to suppress the magnet from being damaged as a result of a collision with the jig.

In the method of manufacturing the rotor according to the present invention, each of the plurality of electromagnetic steel plates may include a positioning part, the positioning parts being fitted to each other in a stacking direction when the plurality of electromagnetic steel plates are stacked on one another and positions of the electromagnetic steel plates are determined in an in-plane direction, and the magnets may be inserted into the respective openings in such a way that an amplitude of the structure becomes larger than an amount of displacement of the electromagnetic steel plates in the in-plane direction. According to this structure, even when the electromagnetic steel plates are displaced in the in-plane direction when the magnet is inserted into the respective openings, the magnet is able to pass through the uneven part of the electromagnetic steel plates, whereby it is possible to reduce the area in which the magnet contacts the inner wall of the opening (electromagnetic steel plates).

According to the present invention, it is possible to provide a method of manufacturing a rotor in which the magnets can be easily inserted into the respective openings of the rotor core.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

<First Embodiment>

Hereinafter, with reference to the drawings, embodiments of the present invention will be described.

Figure 1:
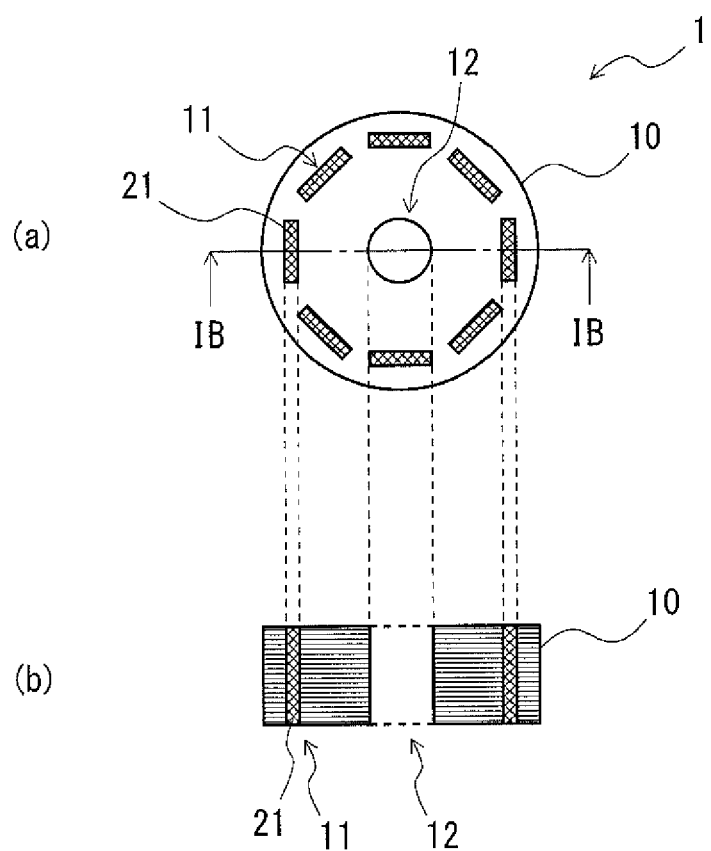
FIG. 1 is a top view and a cross-sectional view showing a rotor manufactured using a method of manufacturing a rotor according to a first embodiment.

FIG. 1 shows in (a) a top view and in (b) a cross-sectional view a rotor manufactured using a method of manufacturing the rotor according to this embodiment. The cross-sectional view shown in FIG. 1(b) is a cross-sectional view taken along the line IB-IB of FIG. 1(a). As shown in FIG. 1, a rotor 1 includes a rotor core 10 and magnets 21. The rotor core 10 has a columnar shape and may be formed by a plurality of electromagnetic steel plates stacked in a rotation shaft direction of the rotor 1. The rotor core 10 includes a plurality of openings 11, and the openings 11 include the respective magnets 21. A through hole 12 is formed at the center of the rotor core 10. While a case in which the magnets 21 are provided in eight respective openings 11 formed in the circumferential direction of the rotor core 10 is shown as an example of FIG. 1, the arrangement of the openings 11 and the magnets 21 is not limited to this arrangement.

Figure 2:
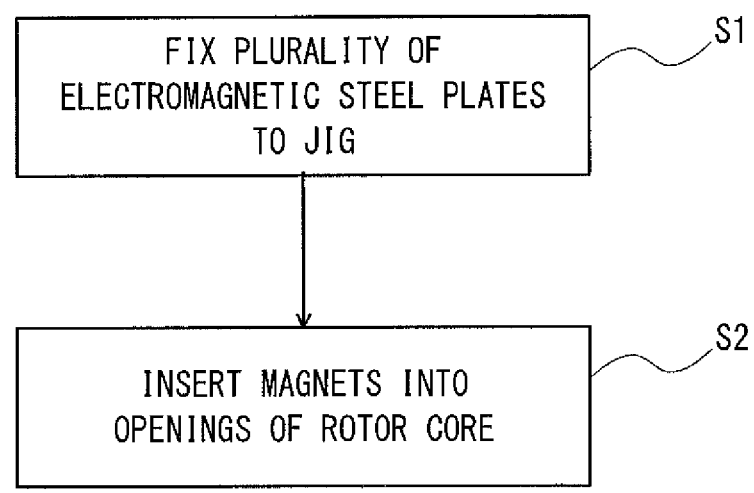
FIG. 2 is a flowchart for describing a method of manufacturing the rotor according to the first embodiment.
Figure 3:
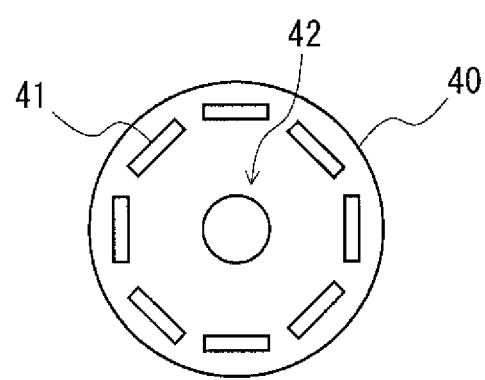
FIG. 3 is a top view showing an electromagnetic steel plate used in the method of manufacturing the rotor according to the first embodiment.

Next, with reference to FIGS. 2 to 5, the method of manufacturing the rotor according to this embodiment will be described. As shown in FIG. 2, the method of manufacturing the rotor according to this embodiment includes a process of stacking the plurality of electromagnetic steel plates on a jig to fix the plurality of electromagnetic steel plates to the jig (Step S1) and a process of inserting magnets into the respective openings of the rotor core (Step S2). FIG. 3 is a top view showing the electromagnetic steel plate used in the method of manufacturing the rotor according to this embodiment. As shown in FIG. 3, the electromagnetic steel plate 40 has a disc shape (thin plate) and includes a through hole 42 at the center thereof. Openings 41 are formed in the circumferential direction of the electromagnetic steel plate. These openings 41 correspond to the openings 11 of the rotor core 10 when the rotor core 10 is formed by stacking the electromagnetic steel plates 40 on one another.

Figure 4:
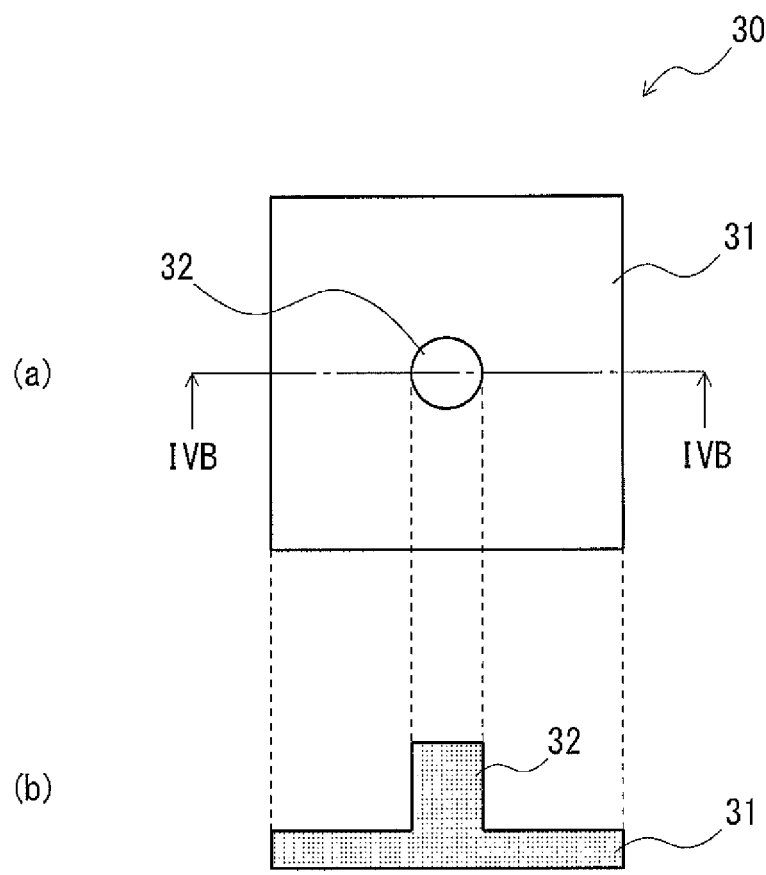
FIG. 4 is a top view and a cross-sectional view showing a jig used in the method of manufacturing the rotor according to the first embodiment.

FIG. 4 shows in (a) a top view and in (b) a cross-sectional view the jig used in the method of manufacturing the rotor according to this embodiment. The cross-sectional view shown in FIG. 4(b) is a cross-sectional view taken along the line IVB-IVB of FIG. 4(a). As shown in FIG. 4, a jig 30 includes a base 31 and a protruding part 32 that protrudes from the base 31 in the stacking direction. The electromagnetic steel plates 40 are stacked on the jig 30 in such a way that the protruding part 32 of the jig 30 penetrates through the through hole 42 of the electromagnetic steel plate 40. For example, the jig 30 can be made of a metallic material or a resin material.

Figure 5:
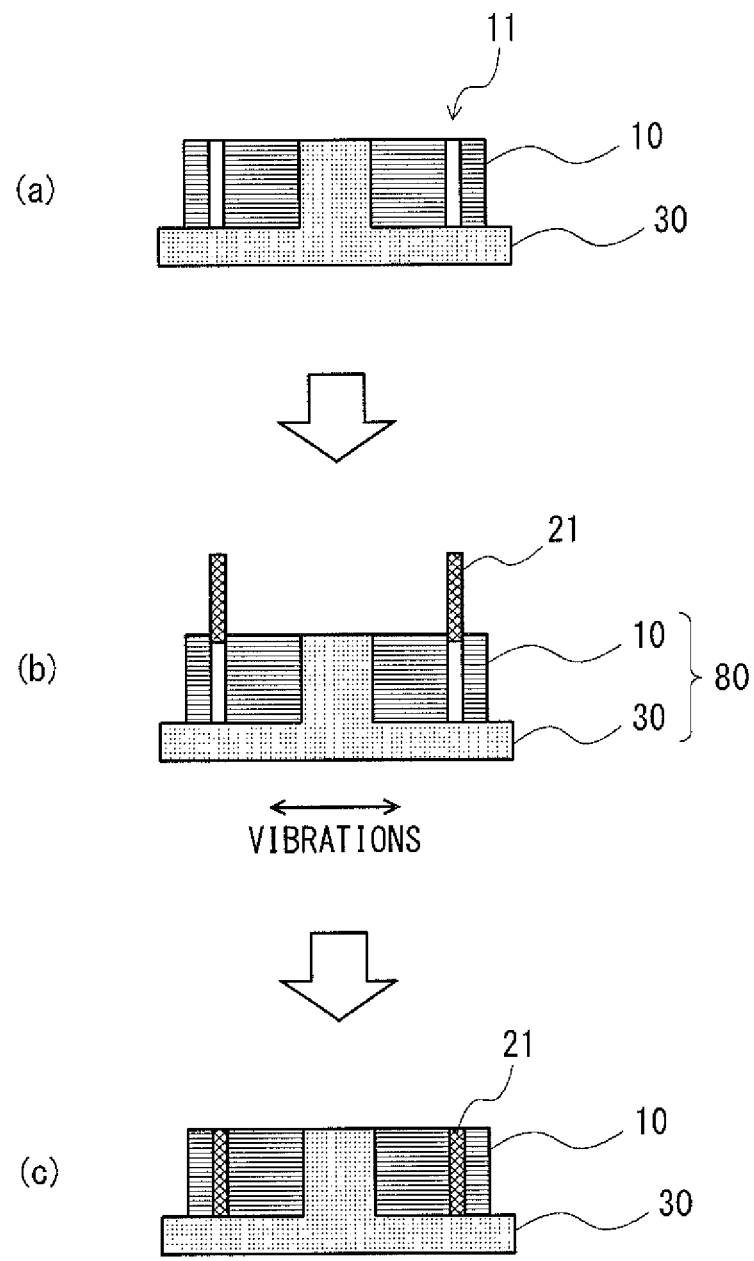
FIG. 5 is a cross-sectional view for describing an example of the method of manufacturing the rotor according to the first embodiment.

With reference to FIG. 5, the method of manufacturing the rotor according to this embodiment will be described in detail. In the method of manufacturing the rotor according to this embodiment, first, as shown in FIG. 5(a), the plurality of electromagnetic steel plates 40 (see FIG. 3) are stacked on the jig 30 and fixed to the jig 30 to form the rotor core 10. At this time, the electromagnetic steel plates 40 are arranged in such a way that the openings 41 (see FIG. 3) of the respective electromagnetic steel plates 40 are arranged in fixed positions in the stacking direction. According to this structure, when the plurality of electromagnetic steel plates 40 are stacked to form the rotor core 10, the openings 11 that open in the stacking direction are formed.

In the method of manufacturing the rotor according to this embodiment, in consideration of the variation in the thickness of each electromagnetic steel plate 40, when the plurality of electromagnetic steel plates 40 are stacked on the jig 30 to form the rotor core 10, the electromagnetic steel plates 40 may be arranged in such a way that the directions thereof are displaced from each other in the in-plane direction for every predetermined number of plates (that is, the electromagnetic steel plates 40 may be arranged in such a way that the directions thereof are shifted from each other (rotary lamination)). By arranging the electromagnetic steel plates as stated above, it is possible to absorb the variation in the thickness of the electromagnetic steel plates 40. In this case, the electromagnetic steel plates 40 are arranged so that the openings 41 (see FIG. 3) of the respective electromagnetic steel plates 40 are located in fixed positions in the stacking direction.

Next, as shown in FIG. 5(*b*), the magnets 21 are inserted into the plurality of respective openings 11 included in the rotor core 10. At this time, the magnets 21 are inserted into the respective openings 11 while a structure 80 including the rotor core 10 and the jig 30 is vibrated at a resonance frequency of the structure 80. FIG. 5(*c*) shows a state in which the magnets 21 have been inserted into the respective openings 11 of the rotor core 10.

Figure 6:
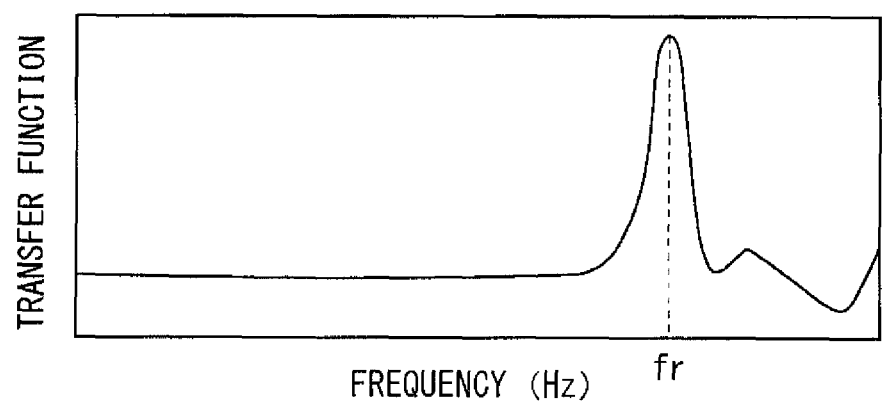
FIG. 6 is a diagram showing a relation between a transfer function and a vibration frequency of a structure.

The structure 80 is a structure in which the rotor core 10 and the jig 30 are integrated with each other. Therefore, the structure 80 has a specific resonance frequency. In this embodiment, the resonance frequency of the structure 80 is obtained in advance. When the resonance frequency of the structure 80 is obtained, as shown in FIG. 6, for example, a transfer function when the structure 80 is vibrated at a predetermined frequency is obtained. That is, the frequency at which the structure 80 is vibrated is swept, and the frequency at which the transfer function becomes the highest is set to a resonance frequency fr.

In this embodiment, since the structure 80 including the rotor core 10 and the jig 30 is vibrated at the resonance frequency, it is possible to gain a large amplitude with a small energy.

Figure 7:
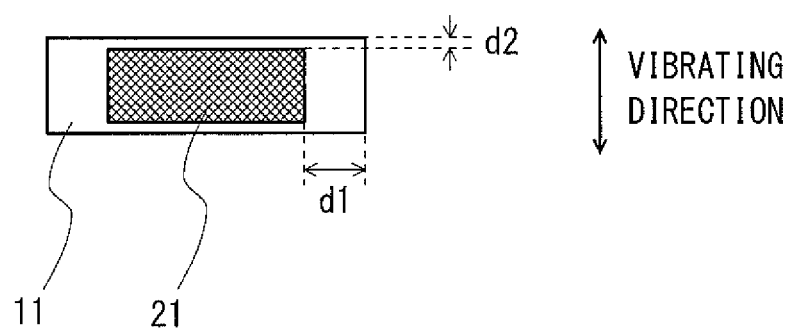
FIG. 7 is a cross-sectional view showing a positional relation between a magnet and an opening of a rotor core.

FIG. 7 is a cross-sectional view showing a positional relation between the magnet 21 and the opening 11 of the rotor core 10. As shown in FIG. 7, the cross-sectional shape of the opening 11 (that is, the cross-sectional shape perpendicular to the stacking direction of the electromagnetic steel plates) is a rectangular shape. Further, the cross-sectional shape of the magnet 21 (that is, the cross-sectional shape perpendicular to the stacking direction of the electromagnetic steel plates) is a rectangular shape corresponding to the cross-sectional shape of the opening 11. The cross-sectional shape of the magnet 21 is a cross section (rectangle) smaller than the cross section (rectangle) of the opening 11 so that the magnet 21 can be inserted into the opening 11.

Figure 8:
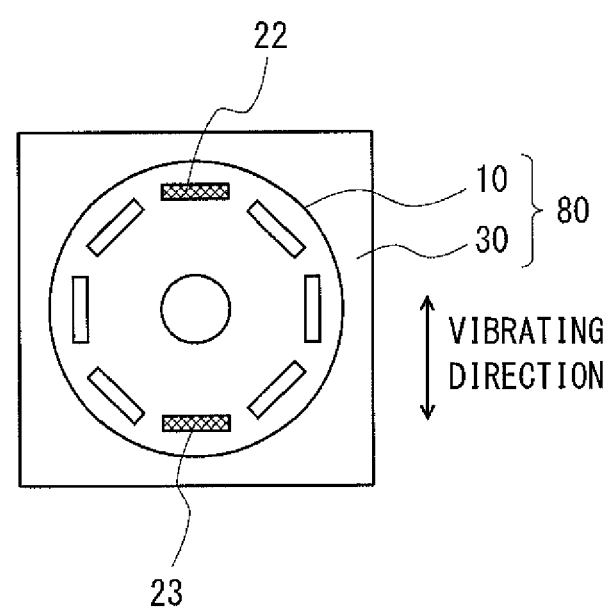
FIG. 8 is a top view for describing a vibrating direction of the rotor core.

Now, the gap between the side wall of the magnet 21 and the inner wall of the opening 11 in the end part in the longitudinal direction of the rectangle when the magnet 21 is inserted into the opening 11 is denoted by a gap d1. Further, the gap between the side wall of the magnet 21 and the inner wall of the opening 11 in the end part in the direction perpendicular to the longitudinal direction of the rectangle when the magnet 21 is inserted into the opening 11 is denoted by a gap d2. In the method of manufacturing the rotor according to this embodiment, for example, the structure 80 is vibrated so that the gap d2 which is narrower than the gap d1 is fluctuated (see the vibrating direction in FIG. 7). In this case, as shown in FIG. 8, magnets 22 and 23 can be concurrently inserted into the respective pair of openings opposed to each other.

As stated above, the structure 80 is vibrated so that the gap d2 which is narrower than the gap d1 is fluctuated, and thus the area in which the side wall of the magnet contacts the inner wall (electromagnetic steel plates) of the opening 11 in the gap d2 (insertion resistance) can be reduced, whereby it is possible to reduce the load required to insert the magnet 21 into the opening 11.

Figure 9:
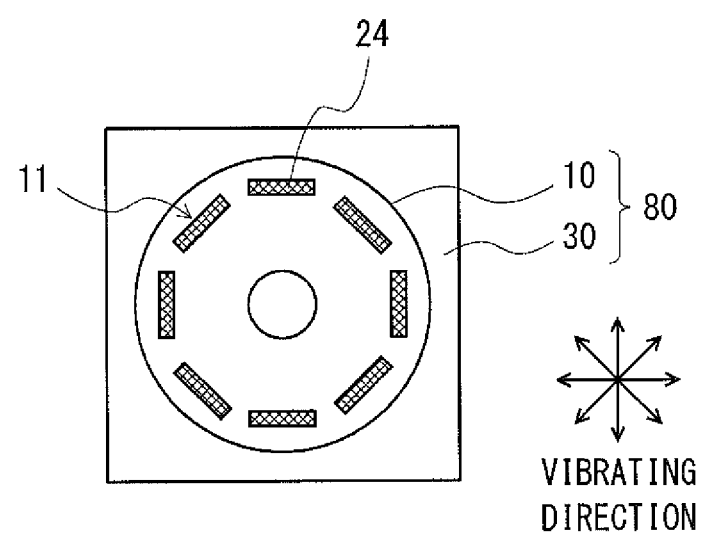
FIG. 9 is a top view for describing the vibrating direction of the rotor core.

Further, in the method of manufacturing the rotor according to this embodiment, the structure 80 may be vibrated in eight directions (random directions), as shown in FIG. 9 (see the vibrating direction in FIG. 9). That is, while the number of magnets that can be concurrently inserted is two magnets 22 and 23 opposed to each other when the vibrating direction is as shown in FIG. 8, magnets 24 located in the respective positions can be inserted into the respective openings 11 when the structure 80 is vibrated in eight directions (random directions) as shown in FIG. 9.

Figure 10:
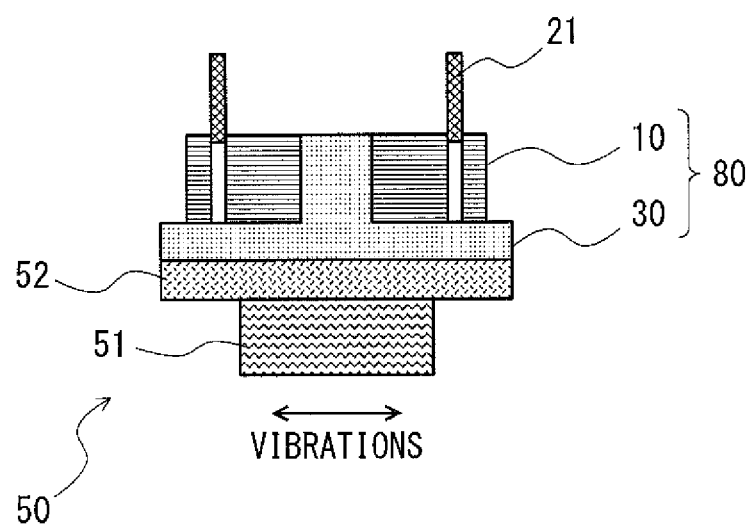
FIG. 10 is a cross-sectional view showing an example in which excitation means for vibrating the rotor core is arranged.

In the method of manufacturing the rotor according to this embodiment, as shown in FIG. 10, for example, the structure 80 may be vibrated using excitation means 50 provided at the bottom part of the structure 80. The excitation means 50 includes a vibrating unit 51 and a connecting part 52. The vibrating unit 51 vibrates at the resonance frequency of the structure 80. The connecting part 52 contacts the bottom part of the structure 80 (that is, the bottom part of the jig 30) and transmits vibrations transmitted from the vibrating unit 51 to the structure 80. The vibrating unit 51 may be formed to vibrate in a specific direction (see FIG. 8) or may be formed to vibrate in the random directions (see FIG. 9).

As shown in FIG. 10, when the vibrations are imparted to the structure 80 from the bottom part side of the structure 80, it is sufficient to put the structure 80 moving on the manufacturing line onto the excitation means 50 to impart vibrations to the structure 80. In this case, the device configuration becomes simple.

Figure 11:
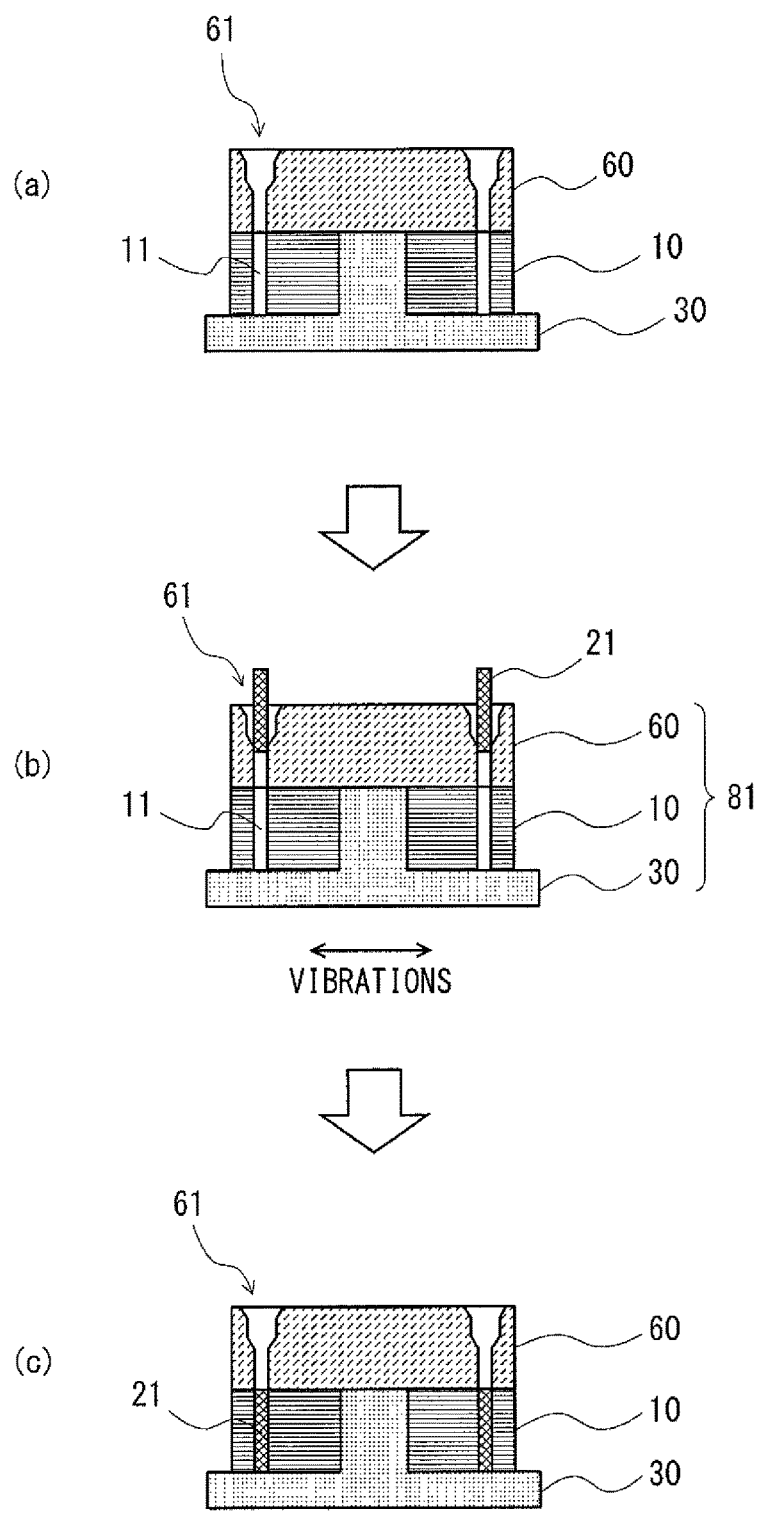
FIG. 11 is a cross-sectional view for describing another example of the method of manufacturing the rotor according to the first embodiment.

Further, in the method of manufacturing the rotor according to this embodiment, as shown in FIG. 11, a guiding member 60 that guides the magnets 21 to the openings 11 may be used to insert the magnets 21 into the respective openings 11. That is, as shown in FIG. 11(*a*), after the plurality of electromagnetic steel plates 40 (see FIG. 3) are stacked on the jig 30 and fixed to the jig 30 to form the rotor core 10, the guiding member 60 may be further arranged on the rotor core 10. The guiding member 60 shown in FIG. 11 has a columnar shape and introducing holes 61 are formed to correspond to the plurality of respective openings 11 of the rotor core 10. The introducing hole 61 is formed so that the entrance side (upper side) thereof becomes wider. It is therefore possible to easily introduce the magnets 21 into the respective openings 11. The guiding member 60 may be formed, for example, using a metallic material or a resin material.

Next, as shown in FIG. 11(*b*), the magnets 21 are arranged in the respective introducing holes 61 of the guiding member 60 and the magnets 21 are inserted into the plurality of respective openings 11 included in the rotor core 10 via the introducing hole 61 of the guiding member 60. At this time, the magnets 21 are inserted into the respective openings 11 via the guiding member 60 while a structure 81 including the rotor core 10, the jig 30, and the guiding member 60 is vibrated at a resonance frequency of the structure 81. FIG. 11(*c*) shows a state in which the magnets 21 are inserted into the respective openings 11 of the rotor core 10. By using the guiding member 60 as stated above, the magnets 21 can be definitely inserted into the respective openings 11.

Figure 12:
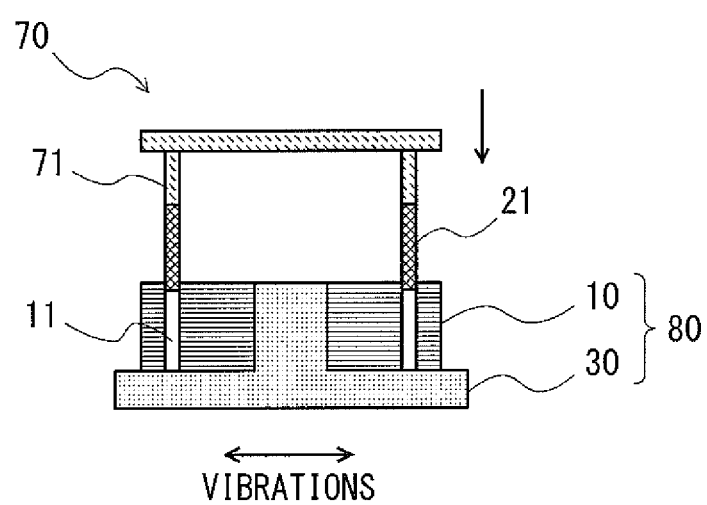
FIG. 12 is a cross-sectional view for describing another example of the method of manufacturing the rotor according to the first embodiment.

Further, in the method of manufacturing the rotor according to this embodiment, as shown in FIG. 12, when the magnets 21 are inserted into the respective openings 11, a pressing jig 70 may be used to push the magnets 21 into the respective openings 11. That is, as shown in FIG. 12, after the plurality of electromagnetic steel plates 40 (see FIG. 3) are stacked on the jig 30 and fixed to the jig 30 to form the rotor core 10, the magnets 21 are inserted into the plurality of respective openings 11 included in the rotor core 10. At this time, the magnets 21 are inserted into the respective openings 11 while the structure 80 including the rotor core 10 and the jig 30 is vibrated at the resonance frequency of the structure 80 and further the magnets 21 are pushed in the direction of the openings 11 by protrusions 71 of the pushing jig 70. The protrusions 71 of the pushing jig 70 are provided to correspond to the magnets 21. That is, when the magnets are concurrently inserted into eight openings 11 as shown in FIG. 9, eight protrusions 71 are provided in the pushing jig 70.

For example, when the openings 11 are narrow, the force of gravity alone may not be sufficient to insert the magnets 21 into the respective openings 11. In such a case, by using the pushing jig 70, the magnets 21 can be definitely inserted into the respective openings 11. In the method of manufacturing the rotor according to this embodiment, as shown in FIG. 11, the pushing jig 70 may be used to insert the magnets 21 into the respective openings 11 using the guiding member 60.

Figure 13:
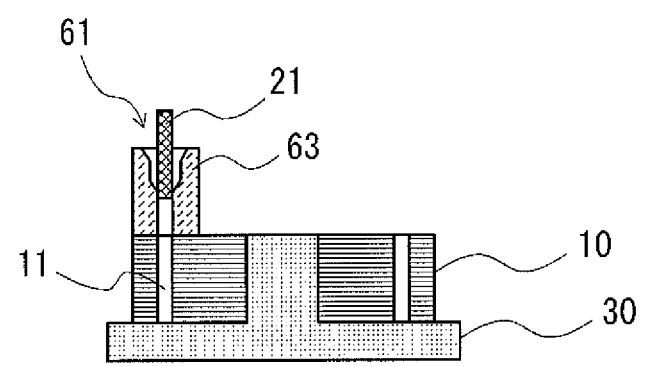
FIG. 13 is a cross-sectional view for describing another example of the method of manufacturing the rotor according to the first embodiment.

Further, while the case in which the guiding member 60 including the plurality of introducing holes 61 formed therein is used has been described with reference to FIG. 11, in the method of manufacturing the rotor according to this embodiment, as shown in FIG. 13, a guiding member 63 may be provided in one opening 11 of the rotor core 10. In this case, the magnets 21 are inserted into the respective openings 11 of the rotor core 10. In the case shown in FIG. 13, the magnets 21 are inserted into the respective openings 11 via the guiding member 63 while the structure including the rotor core 10, the jig 30, and the guiding member 63 is vibrated at the resonance frequency of the structure.

As described in the Background of the Invention, the rotor used in the rotating electric machine is formed by inserting the magnets into the plurality of respective openings included in the rotor core. In order to improve torque of the rotating electric machine, a magnetic field from the magnets needs to be efficiently transmitted to the rotor core. To enable this efficient transmission, a gap between each of the magnets and the inner wall of each of the respective openings of the rotor core needs to be narrowed.

Figure 14:
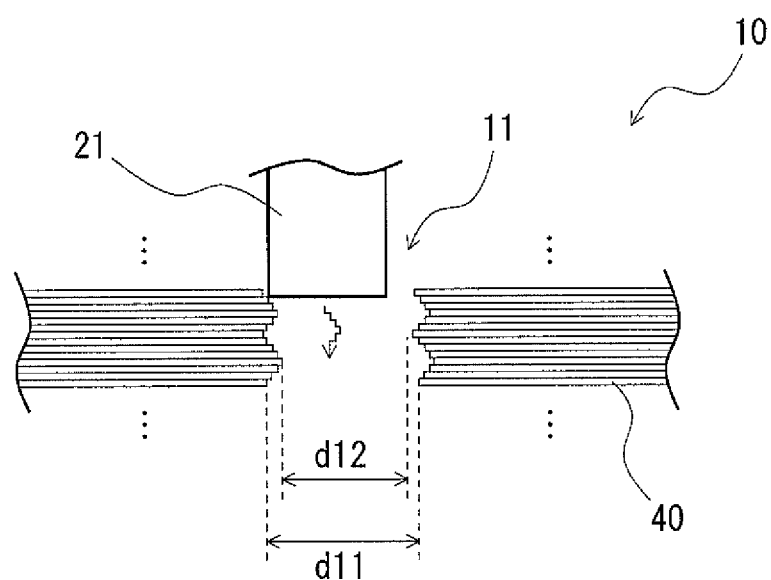
FIG. 14 is an enlarged cross-sectional view of a part around the opening of the rotor core.

However, when the rotor core is formed by the plurality of electromagnetic steel plates that are stacked on one another, due to a positional deviation or the like when the electromagnetic steel plates are stacked on one another, the size of the opening of the rotor core varies. FIG. 14 is an enlarged cross-sectional view of a part around the opening 11 of the rotor core 10. As shown in FIG. 14, when the rotor core 10 is formed by the plurality of electromagnetic steel plates 40 that are stacked on one another, due to a positional deviation or the like when the electromagnetic steel plates 40 are stacked on one another, the size of the opening 11 of the rotor core 10 varies. That is, while the opening of each of the electromagnetic steel plates 40 has a width d11, when the electromagnetic steel plates 40 are stacked on one another, due to a positional deviation or the like of each electromagnetic steel plate 40, the actual width of the opening 11 of the rotor core 10 is a width d12, which is narrower than the width d11.

Further, when the electromagnetic steel plates 40 are stacked, as shown in FIG. 14, due to a positional deviation or the like in the electromagnetic steel plates 40, the side wall of the opening 11 becomes uneven, resulting in the degree of straightness of the opening 11 being degraded. Therefore, when the gap between the magnet 21 and the inner wall of the opening 11 of the rotor core 10 becomes too narrow, the area in which the magnet 21 contacts the inner wall of the opening 11 increases, and it thus becomes difficult to insert the magnet 21 into the opening 11 of the rotor core 10.

In order to solve the above problem, in the method of manufacturing the rotor according to this embodiment, when the magnet 21 is inserted into the opening 11 of the rotor core 10, the magnet 21 is inserted into the opening 11 while the structure 80 including the rotor core 10 and the jig 30 (in the case shown in FIG. 11, the structure 81 including the rotor core 10, the jig 30, and the guiding member 60) is vibrated at the resonance frequency of the structure 80. That is, by inserting the magnet 21 into the opening 11 while the rotor core 10 is vibrated, as shown in FIG. 14, the magnet 21 is inserted into the opening 11 while passing through the uneven part of the electromagnetic steel plates 40. It is therefore possible to reduce the area in which the magnet 21 contacts the inner wall (electromagnetic steel plates) of the opening 11 and reduce the load required to insert the magnet 21 into the opening 11. At this time, since the structure 80 including the rotor core 10 and the jig 30 (in the case shown in FIG. 11, the structure 81 including the rotor core 10, the jig 30, and the guiding member 60) is vibrated at the resonance frequency, it is possible to obtain a large amplitude with a small energy.

Figure 15:
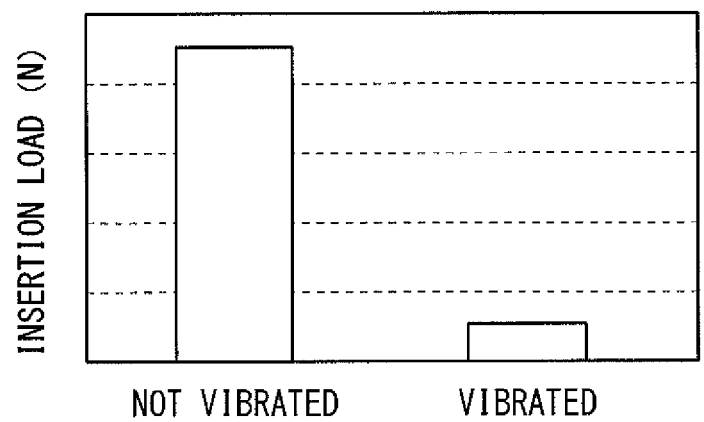
FIG. 15 is a diagram for describing effects of the present invention.

FIG. 15 is a diagram showing the load required to insert the magnet 21 into the opening 11 and shows results when the structure including the rotor core 10 is vibrated and when it is not vibrated. As shown in FIG. 15, when the structure including the rotor core 10 is vibrated, the load required to insert the magnet 21 into the opening 11 is dramatically reduced compared to the case in which the structure is not vibrated.

Further, by using the method of manufacturing the rotor according to this embodiment, the area in which the magnet 21 contacts the inner wall (electromagnetic steel plates) of the opening 11 can be reduced, whereby it is possible to suppress the magnet 21 from being scratched. Further, since it is possible to make the gap between the magnet and the inner wall of the opening narrow, the torque of the rotating electric machine can be improved.

According to the method of manufacturing the rotor according to this embodiment described above, it is possible to provide a rotor in which the magnets can be easily inserted into the respective openings of the rotor core.

<Second Embodiment>

Next, a second embodiment of the present invention will be described.

Figure 16:
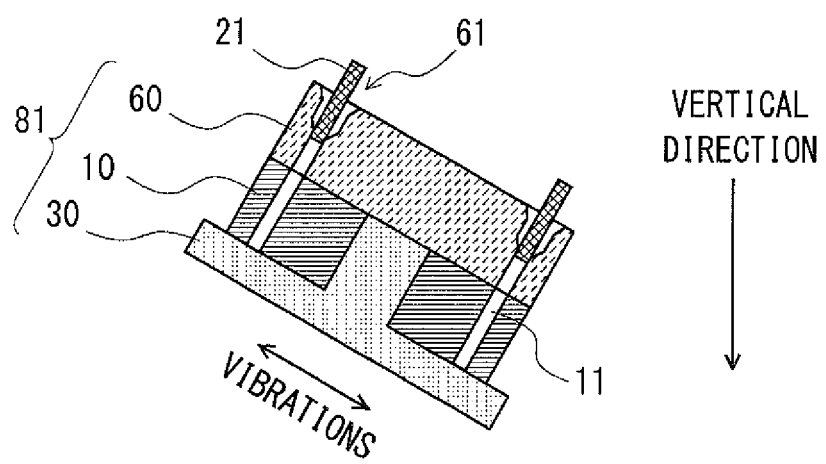
FIG. 16 is a cross-sectional view for describing one example of a method of manufacturing a rotor according to a second embodiment.

In a method of manufacturing a rotor according to this embodiment, as shown in FIG. 16, the magnets 21 may be inserted into the respective openings 11 while inclining the structure 81 so that the opening direction of the openings 11 becomes inclined with respect to the vertical direction. Since the other structures are similar to those described in the first embodiment (see particularly FIG. 11), the same components are denoted by the same reference symbols and the overlapping descriptions will be omitted.

In the method of manufacturing the rotor described in the first embodiment, the opening direction of the openings 11 of the rotor core 10 (in other words, the insertion direction of the magnets 21) becomes parallel to the vertical direction. When the opening direction of the openings 11 is made parallel to the vertical direction, the gravitational force acting on the magnets 21 becomes the largest and the speed when the magnets 21 are inserted into the respective openings 11 may become too fast. Therefore, when the magnets 21 are inserted into the respective openings 11, the magnets 21 may strongly hit the jig 30, which may cause the magnets 21 to be damaged.

In order to avoid this problem, in the method of manufacturing the rotor according to this embodiment, as shown in FIG. 16, the magnets 21 are inserted into the respective openings 11 while inclining the structure 81 including the rotor core 10, the jig 30, and the guiding member 60 with respect to the vertical direction. In other words, the opening direction of the openings 11 of the rotor core 10 (in other words, insertion direction of the magnets 21) is inclined with respect to the vertical direction. It is therefore possible to suppress the speed of the magnets 21 from being too fast when the magnets 21 are inserted into the respective openings 11, whereby it is possible to suppress the magnets 21 from being damaged.

The speed when the magnets 21 are inserted into the respective openings 11 can be adjusted by changing the inclination of the openings 11 of the rotor core 10. That is, as the inclination of the openings 11 of the rotor core 10 becomes closer to the vertical direction, the speed when the magnets 21 are inserted into the respective openings 11 becomes fast. In contrast, as the inclination of the openings 11 of the rotor core 10 becomes closer to the horizontal direction, the speed when the magnets 21 are inserted into the respective openings 11 becomes low.

Figure 17:
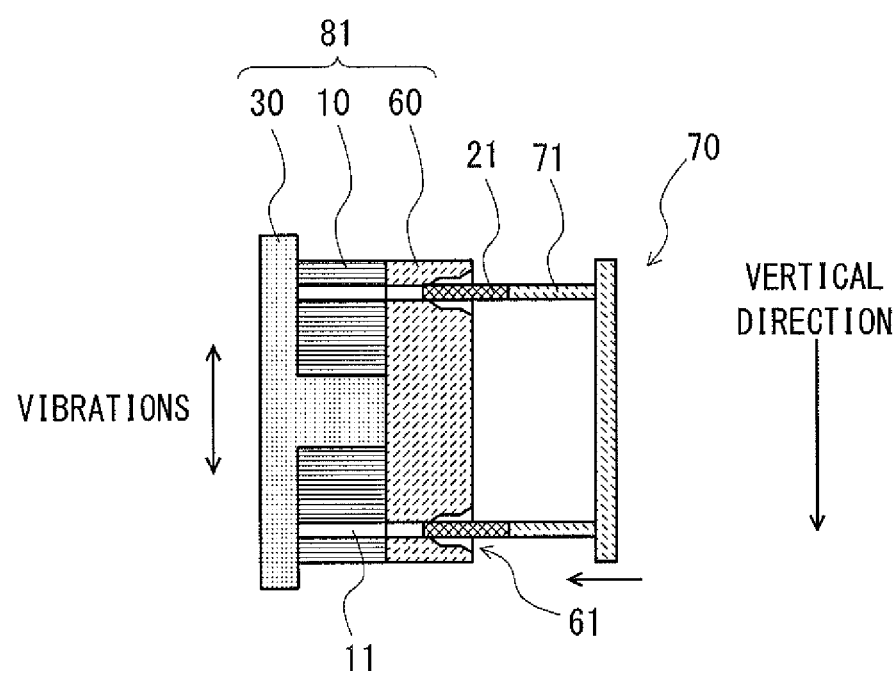
FIG. 17 is a cross-sectional view for describing another example of the method of manufacturing the rotor according to the second embodiment.

Further, in the method of manufacturing the rotor according to this embodiment, as shown in FIG. 17, when the magnets 21 are inserted into the respective openings 11, the structure 81 may be arranged so that the opening direction of the openings 11 becomes parallel to the horizontal direction to insert the magnet 21 into the opening 11 using the pushing jig 70. In this case, the speed when the magnets 21 are inserted into the respective openings 11 may be adjusted by changing the push-in speed of the pushing jig 70. According to the configuration shown in FIG. 17 as well, it is possible to suppress the speed of the magnets 21 from becoming too fast when the magnets 21 are inserted into the respective openings 11, whereby it is possible to suppress the magnets 21 from being damaged. Further, it is possible to adjust the position in which the magnets are inserted.

In the method of manufacturing the rotor according to this embodiment, the opening direction of the openings 11 becomes inclined with respect to the vertical direction (FIG. 16) or the opening direction of the openings 11 becomes parallel to the horizontal direction (FIG. 17). Therefore, the guiding member 60 to guide the magnets 21 to the openings 11 of the rotor core 10 is required.

<Other Embodiments>

Next, other embodiments of the present invention will be described.

Figure 18:
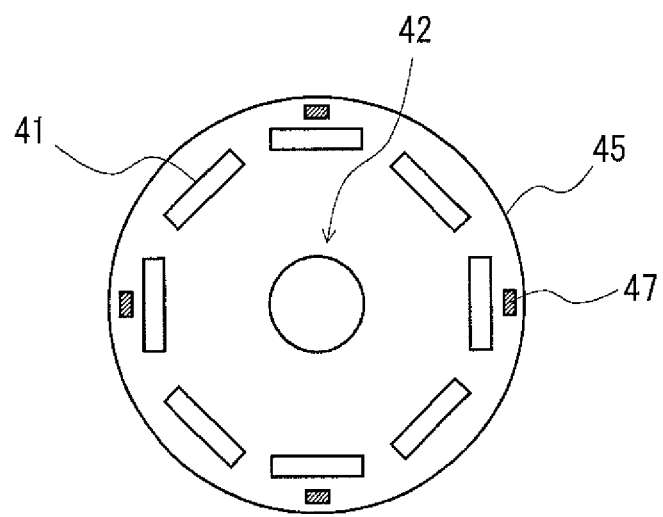
FIG. 18 is a top view showing another configuration example of an electromagnetic steel plate.

As shown in FIG. 18, in the embodiment, positioning parts 47 may be provided in each of the electromagnetic steel plates 45. When the electromagnetic steel plates 45 are stacked on one another, the positioning parts 47 determine the positions of the electromagnetic steel plates 45 in the in-plane direction. For example, the positioning parts 47 are formed along the outer periphery of the electromagnetic steel plates 45.

Figure 19:
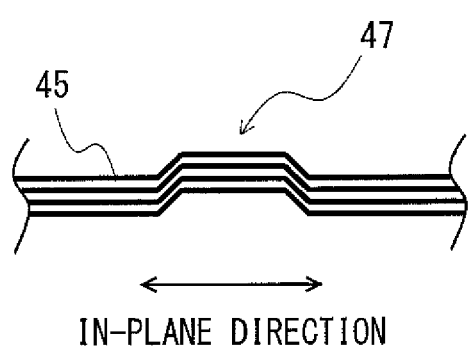
FIG. 19 is a cross-sectional view showing another configuration example of the electromagnetic steel plates.

FIG. 19 is a cross-sectional view showing a state in which the electromagnetic steel plates 45 are stacked on one another. As shown in FIG. 19, for example, the positioning part 47 of the each of the electromagnetic steel plates 45 may have a dowel caulking structure including a convex part on the upper part of the electromagnetic steel plate 45 and a concave part on the lower part thereof. For example, the positioning parts 47 may be formed when the electromagnetic steel plates 45 are press-formed.

As shown in FIG. 19, the positioning parts 47 of each of the electromagnetic steel plates 45 are arranged so that the positioning parts 47 are fitted to each other in the stacking direction. It is therefore possible to determine the position of each electromagnetic steel plate 45 in the in-plane direction. As stated above, by providing the positioning parts 47 in each of the electromagnetic steel plates 45, there is no need to pressurize the rotor core 10 in the stacking direction after the rotor core 10 is formed by the electromagnetic steel plates 45 that are stacked on one another. It is therefore possible to vibrate each of the electromagnetic steel plates 45 using the elasticity of the electromagnetic steel plate 45, whereby it is possible to efficiently insert the magnet 21 into the opening 11.

When the positioning parts 47 provided in each of the electromagnetic steel plates 45 are fitted to each other, there is a predetermined gap (clearance) between the convex part and the concave part of the positioning part 47. Therefore, when the electromagnetic steel plates 45 are stacked, the electromagnetic steel plates 45 are somewhat displaced in the in-plane direction. In consideration of this point, in this embodiment, when the magnets 21 are inserted into the respective openings 11, the amplitude of the structures 80 and 81 including the rotor core 10 and the like becomes larger than the amount of displacement of the electromagnetic steel plates 45 in the in-plane direction. In other words, when the magnets 21 are inserted into the respective openings 11, the amplitude of the structures 80 and 81 including the rotor core 10 and the like becomes larger than the amount of clearance between the convex part and the concave part of the positioning part 47. According to this structure, even when the electromagnetic steel plates 45 are displaced in the in-plane direction, the magnet 21 is able to pass through the uneven part of the electromagnetic steel plates 45, whereby it is possible to reduce the area in which the magnet 21 contacts the inner wall (electromagnetic steel plates) of the opening 11.

Further, in this embodiment, besides the plurality of magnets 21 being embedded, a plurality of magnetic bodies 28 may be embedded in a rotor core 10'. The plurality of magnetic bodies 28 serve to adjust the direction and the like of the magnetic flux generated by the plurality of magnets 21. For example, the magnetic body 28 may be formed using a non-magnetic body.

Figure 20:
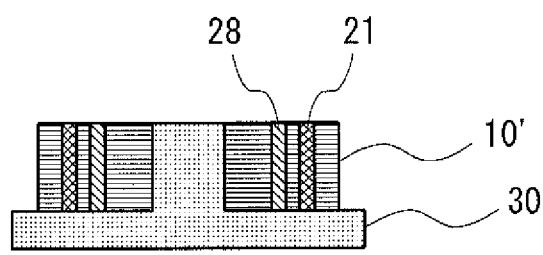
FIG. 20 is a cross-sectional view showing another configuration example of the rotor.
Figure 21:
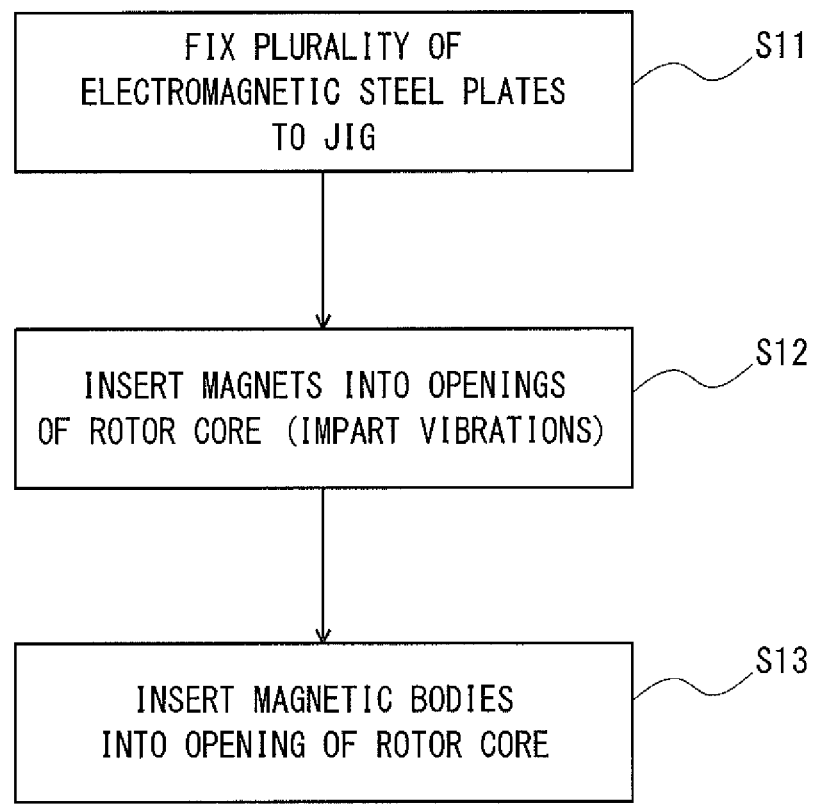
FIG. 21 is a flowchart for describing a method of manufacturing a rotor according to another embodiment.

When the rotor having a structure shown in FIG. 20 is manufactured, as shown in the flowchart in FIG. 21, the plurality of electromagnetic steel plates are first fixed to the jig to form the rotor core 10' (Step S11). Next, the magnets 21 are inserted into the respective openings of the rotor core 10' (Step S12). At this time, the magnets 21 are inserted into the respective openings while the structure including the rotor core 10' and the jig 30 is vibrated at the resonance frequency of the structure. Next, the magnetic bodies 28 are inserted into the respective openings of the rotor core 10' (Step S13). When the magnets 21 are inserted into the respective openings in Step S12, the position of each electromagnetic steel plate in the in-plane direction is corrected by the magnets 21. Therefore, the degree of straightness of the openings through which the magnetic bodies 28 are inserted is improved. Therefore, when the magnetic bodies 28 are inserted into the respective openings, the structure including the rotor core 10' and the jig 30 may not be vibrated.

That is, instead of concurrently inserting the magnets 21 and the magnetic bodies 28 into the openings of the rotor core 10', the process of inserting the magnets 21 (Step S12) and the process of inserting the magnetic bodies 28 (Step S13) are separated from each other, whereby it is possible to easily insert the magnetic bodies 28 at the latter process.

Figure 22:
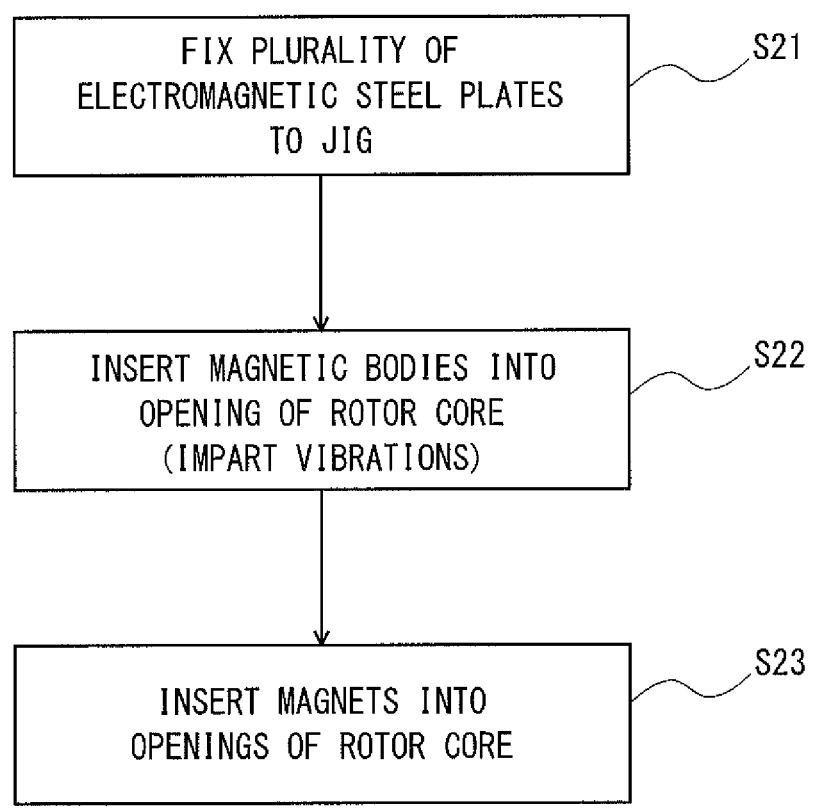
FIG. 22 is a flowchart for describing the method of manufacturing the rotor according to another embodiment.

In the method of manufacturing the rotor having a structure shown in FIG. 20, the process of inserting the magnets 21 (Step S12) and the process of inserting the magnetic bodies 28 (Step S13) may be reversed. That is, as shown in the flowchart shown in FIG. 22, first, the plurality of electromagnetic steel plates are fixed to the jig to form the rotor core 10' (Step S21). Next, the magnetic bodies 28 are inserted into the respective openings of the rotor core 10' (Step S22). At this time, the magnetic bodies 28 are inserted into the respective openings while the structure including the rotor core 10' and the jig 30 is vibrated at the resonance frequency of the structure. Next, the magnets 21 are inserted into the respective openings of the rotor core 10' (Step S23). In this case as well, when the magnetic bodies 28 are inserted into the respective openings in Step S22, the position of each electromagnetic steel plate in the in-plane direction is corrected by the magnetic bodies 28. Therefore, the degree of straightness of the openings into which the magnets 21 are inserted is improved, which eliminates the need for vibrations of the structure including the rotor core 10' and the jig 30 when the magnets 21 are inserted into the respective openings.

In the method of manufacturing the rotor according to this embodiment described above, the magnets 21 may be magnetized after the magnets 21 are inserted into the respective openings 11 of the rotor core 10. It is therefore possible to suppress the situation in which it is difficult for the magnets 21 to enter the openings 11 due to an influence of the magnetic force of the magnets 21 when the magnets 21 are inserted into the respective openings 11.

Further, as shown in FIG. 13, when the guiding member 63 is provided in one opening 11 of the rotor core 10, only the guiding member 63 may be vibrated to insert the magnet 21 into the opening 11 via the guiding member 63. As stated above, only the guiding member 63 is vibrated, and thus the equipment may be formed at a low cost.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a rotor comprising:

stacking a plurality of electromagnetic steel plates on a jig to fix the electromagnetic steel plates to the jig, and inserting magnets into a plurality of respective openings included in a rotor core in which the plurality of electromagnetic steel plates are stacked on one another, wherein:

each of the plurality of electromagnetic steel plates includes a positioning part, the positioning parts being fitted to each other in a stacking direction when the plurality of electromagnetic steel plates are stacked on one another and positions of the electromagnetic steel plates are determined in an in-plane direction, and the magnets are inserted into the respective openings by vibrating a structure including the rotor core and the jig at a resonance frequency of the structure in such a way that an amplitude of the structure becomes larger than an amount of displacement of the electromagnetic steel plates in the in-plane direction.

2. The method of manufacturing the rotor according to claim 1, wherein:

the structure further comprises a guiding member that guides the magnets to the openings when the magnets are inserted into the respective openings, and the magnets are inserted into the respective openings by vibrating the structure including the rotor core, the jig, and the guiding member at a resonance frequency of the structure.

3. The method of manufacturing the rotor according to claim 2, wherein the magnets are inserted into the respective openings while inclining the structure so that an opening direction of the opening becomes inclined with respect to a vertical direction.

* * * * *